US008854305B2

United States Patent
Liu

(10) Patent No.: US 8,854,305 B2
(45) Date of Patent: Oct. 7, 2014

(54) TRANSFORMABLE CURSOR CONTROLLING APPARATUS

(75) Inventor: En Liu, Chengdu (CN)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 236 days.

(21) Appl. No.: 13/572,785

(22) Filed: Aug. 13, 2012

(65) Prior Publication Data

US 2013/0154932 A1    Jun. 20, 2013

(30) Foreign Application Priority Data

Dec. 19, 2011  (CN) .................. 2011 2 0530897 U

(51) Int. Cl.
*G06F 3/033*    (2013.01)
(52) U.S. Cl.
USPC ............................ 345/163; 345/156; 345/157
(58) Field of Classification Search
CPC . G06F 3/03543; G06F 3/03549; G06F 3/039; G06F 3/038
USPC ....................................................... 345/163
See application file for complete search history.

(56) References Cited

U.S. PATENT DOCUMENTS

| | | | |
|---|---|---|---|
| 6,720,950 B2 * | 4/2004 | Cheng | 345/163 |
| 7,023,424 B2 * | 4/2006 | Wei | 345/163 |
| 7,764,270 B2 * | 7/2010 | Shigeno et al. | 345/163 |
| 8,185,398 B2 * | 5/2012 | Anderson et al. | 704/270 |
| 2003/0071790 A1 * | 4/2003 | Cheng | 345/163 |
| 2004/0061682 A1 * | 4/2004 | Landfried | 345/163 |
| 2004/0178991 A1 * | 9/2004 | Wei | 345/163 |
| 2006/0176277 A1 * | 8/2006 | Daniel et al. | 345/163 |
| 2006/0250366 A1 * | 11/2006 | Shigeno et al. | 345/163 |
| 2007/0030248 A1 * | 2/2007 | Chen et al. | 345/163 |
| 2007/0159463 A1 * | 7/2007 | Huang | 345/163 |

\* cited by examiner

*Primary Examiner* — Van Chow
(74) *Attorney, Agent, or Firm* — Li & Cai Intellectual Property (USA) Office

(57) ABSTRACT

A transformable cursor controlling apparatus includes a pair of housings which are a first housing and a second housing. The first housing has a first joint surface, and two sockets received therein and exploded outside the first joint surface. The second housing has a second joint surface corresponding to the first joint surface of the first housing. The second housing has an electrical connector protruded from the second joint surface and selectively inserted into one of the two sockets. A cursor controlling module is disposed in one of the pair of housings for controlling a cursor of computer. When the second housing is rotated 180 degrees related to the first housing along an axil line on the first joint surface of the first housing, the electrical connector can be inserted in the other socket.

12 Claims, 5 Drawing Sheets

TRANSFORMABLE CURSOR CONTROLLING APPARATUS

BACKGROUND OF THE INVENTION

1. Field of the Invention

The present disclosure is related to a transformable cursor controlling apparatus. In particular, the present invention relates to a cursor controlling apparatus for controlling a cursor of computer whose posture is transformable.

2. Description of Related Art

Although the wireless computer mouse was continuously designed to change the appearance to attract consumers, the features changed rarely.

The related patent of conventional computer mouse with transformable posture, such as Taiwan patent issue no. 1331297, has a housing divided into a first housing, a second housing and a connecting mechanism for electrical connection.

The prior art provides many kinds of connections way between the first housing and the second housing, however there are still some disadvantages could be improved. For example, concerning the electrical connecting elements, it used planar contact pads. This way may cause some uncertain electrical connection, and are also easily oxidized with poor contact. Further, the mechanical connection used magnets to attach the first housing and the second housing to each other. This way is easily to cause the first housing and the second housing apart because of external force. In the same disclosure, other complex mechanical connections are provided to strengthen the connection. However, such way needs to turn the first housing to a special angle or position related to the second housing, and then turn 90 degrees or push a predetermined distance, to make the first housing engaged with the second housing. The operations of such mechanical connections are not convenient and direct.

To address the above issues, the inventor strives via industrial experience and academic research to present the instant disclosure, which can effectively improve the limitations described above.

SUMMARY OF THE INVENTION

The object of the instant disclosure is to provide a transformable cursor controlling apparatus, which provides a simplified connection structure between two housings to simplify the assembly procedure, and achieves both effectiveness of mechanical connection and electrical connection.

In order to achieve the above objectives, the present disclosure is to provide a transformable cursor controlling apparatus, which includes a pair of housings, a first housing and a second housing. The first housing has a first joint surface, and the second housing has a second joint surface. Two sockets are disposed in the first housing and exposed on the first joint surface. The two sockets are symmetrically arranged along a center of the first joint surface. An electrical connector is disposed in the second housing and protruded from the second joint surface. The electrical connector is apart from a center of the second joint surface with a predetermined distance and selectively plugged in one of the two sockets. A cursor controlling module, disposed in one of the two housings for controlling a cursor of computer. The second joint surface of the second housing is rotated 180 degrees along a central axle related to the first joint surface of the first housing, so that the electrical connector can be plugged in the other socket.

Thus, the present disclosure has advantages as followed. The transformable cursor controlling apparatus can be assembled in two different postures, which respectively corresponding to a working condition and an idle condition of the computer mouse. The electrical connector can provide functions of electrical and mechanical connection.

For further understanding of the present disclosure, reference is made to the following detailed description illustrating the embodiments and examples of the present disclosure. The description is for illustrative purpose only and is not intended to limit the scope of the claim.

DETAILED DESCRIPTION OF THE PREFERRED EMBODIMENTS

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "first" and "second" are used to interpret some elements, but not limited to. Therefore, the following first element also can be deemed as second element.

Figure 1:
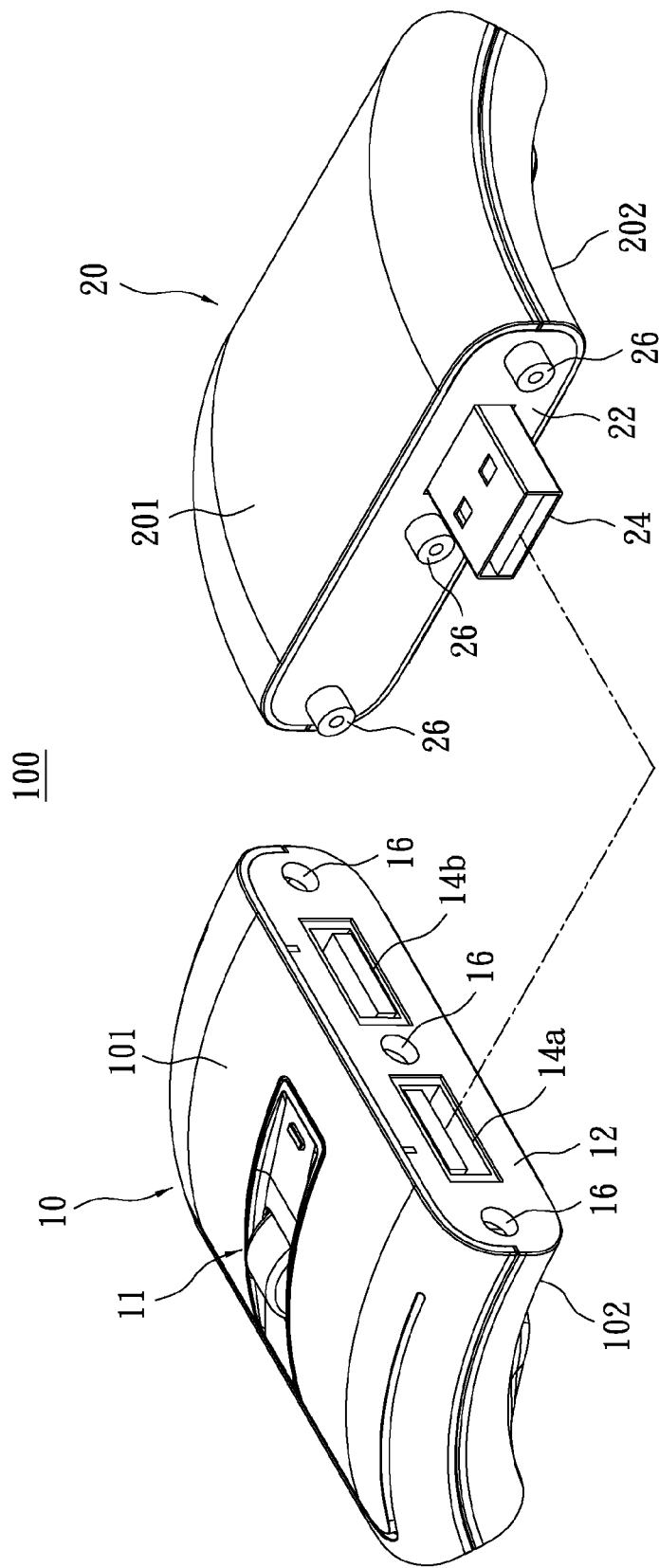
FIG. 1 is a perspective exploded view of a transformable cursor controlling apparatus of first configuration according to the present disclosure.

Reference is made to FIG. 1, which is a perspective exploded view of transformable cursor controlling apparatus according to the present disclosure. A transformable cursor controlling apparatus 100 includes a first housing 10 and a second housing 20. The first housing 10 has an upper surface 101, a lower surface 102 and a first joint surface 12. The second housing 20 has an upper surface 201, a lower surface 202 and a second joint surface 22 corresponding to the first joint surface 12. In this embodiment, from a side view, the first housing 10 and the second housing 20 both are arc-shaped. The second joint surface 22 and the first joint surface 12 both are substantially rectangular shape. However, the invention is not limited thereto.

In this embodiment, the first housing 10 includes a cursor controlling module 11 for controlling a cursor of computer, and two sockets 14a, 14b which are exposed on the first joint surface 12 of the first housing 10. The cursor controlling module 11 generally can include an optical module, a roller and buttons . . . etc. for controlling a cursor of computer, which belongs conventional technology and not mentioned redundantly. However, a reasonable modified embodiment, the cursor controlling module can be arranged in the second housing 20, and the transformable cursor controlling apparatus of the present disclosure also work normally. The two sockets 14a, 14b of this embodiment preferably are directional. In other words, if the two sockets 14a, 14b are rotated 180 degrees, they are upside down. For example, as shown in FIG. 1, in this embodiment, the two sockets 14a, 14b are USB sockets, but not limited thereto.

The second housing 20 has an electrical connector 24 which protruded from the second joint surface 22, and the electrical connector 24 is selectively plugged in one of the sockets 14a, 14b of the first housing 10. The electrical connector 24 of this embodiment is an USB plug, but not limited thereto. The second housing 20 can receive a rechargeable battery therein and uses the electrical connector 24 to plug in one of the sockets, so that electricity power can be supplied to the cursor controlling module 11 of the first housing 10. Besides, the second housing 20 can use the electrical connector 24 to directly plug in a rechargeable socket for recharging, such as USB sockets of computers. The second housing 20 can further receive a wireless transceiver element therein.

Figure 2:
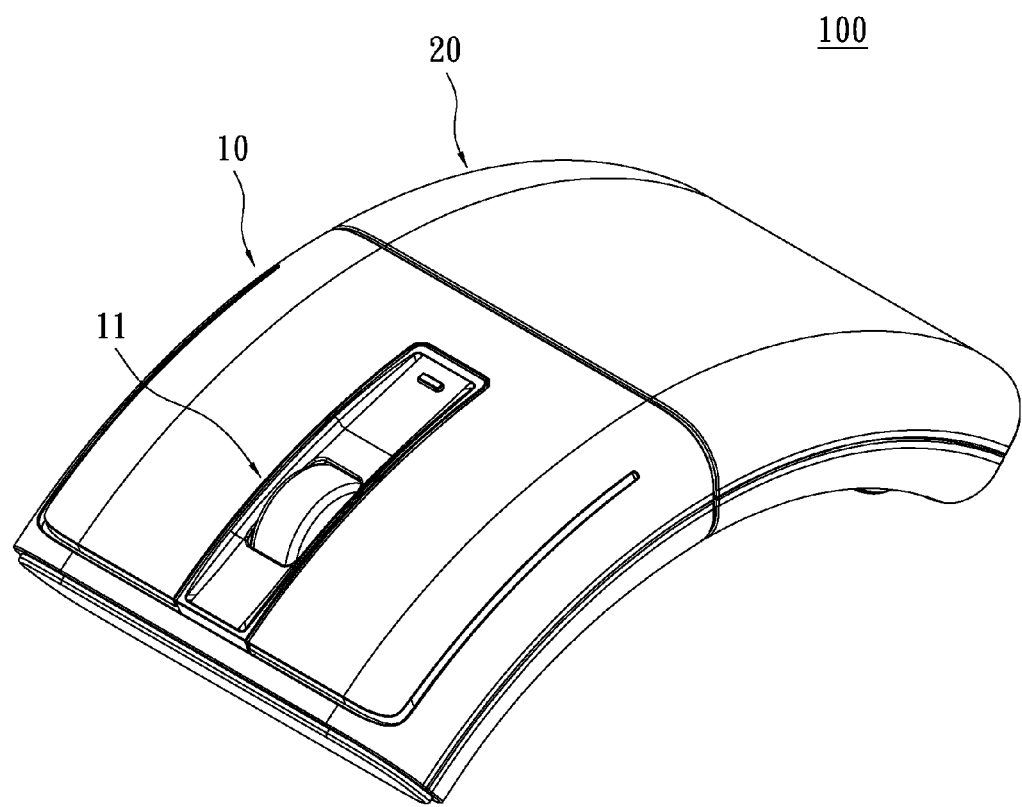
FIG. 2 is a perspective assembled view of the transformable cursor controlling apparatus of first configuration according to the present disclosure.

Please refer to FIG. 1 and FIG. 2. When the electrical connector 24 is plugged in one of the two sockets, for example the socket 14a, the first housing 10 and the second housing 20 are connected into an arc posture as shown in FIG. 2, the cursor controlling module 11 is began to function as working condition for providing the function of mouse.

Figure 3:
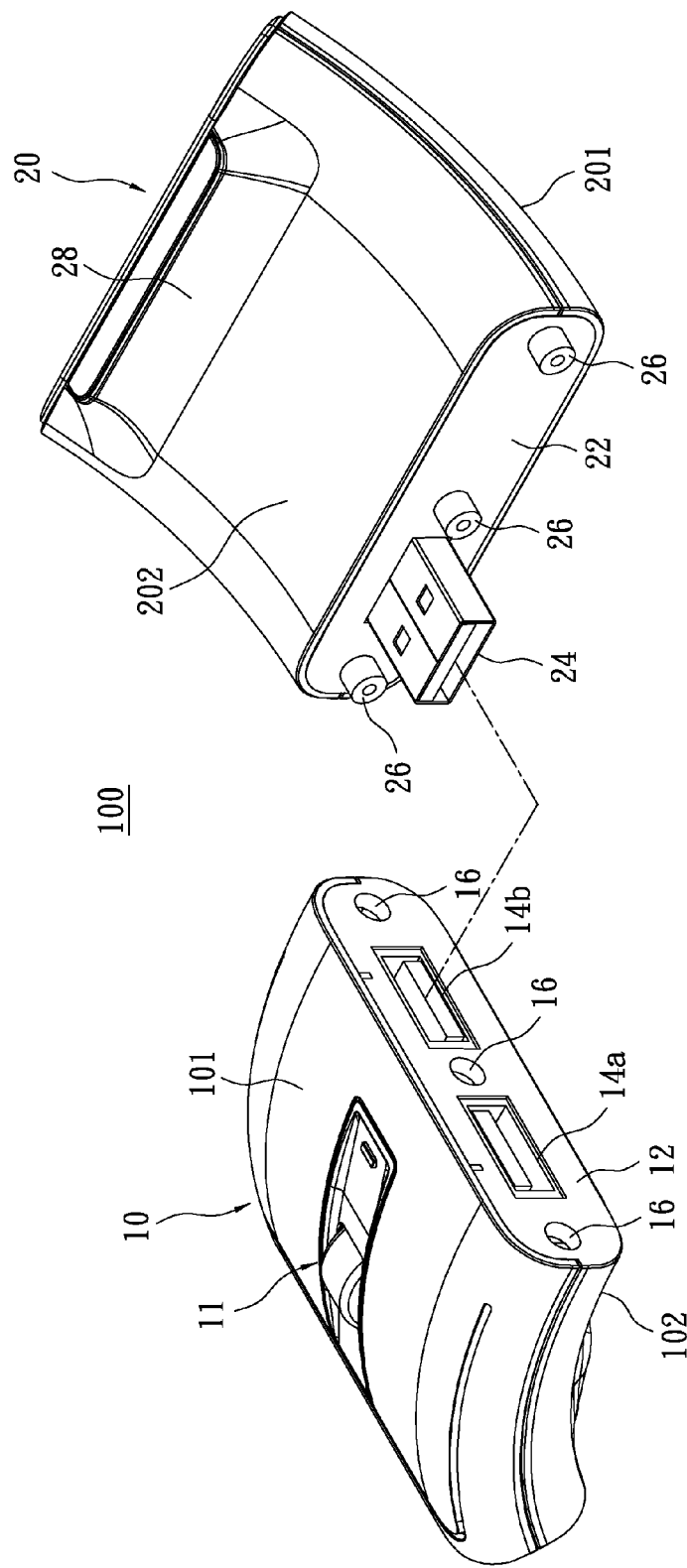
FIG. 3 is a perspective exploded view of the transformable cursor controlling apparatus of second configuration according to the present disclosure.
Figure 4:
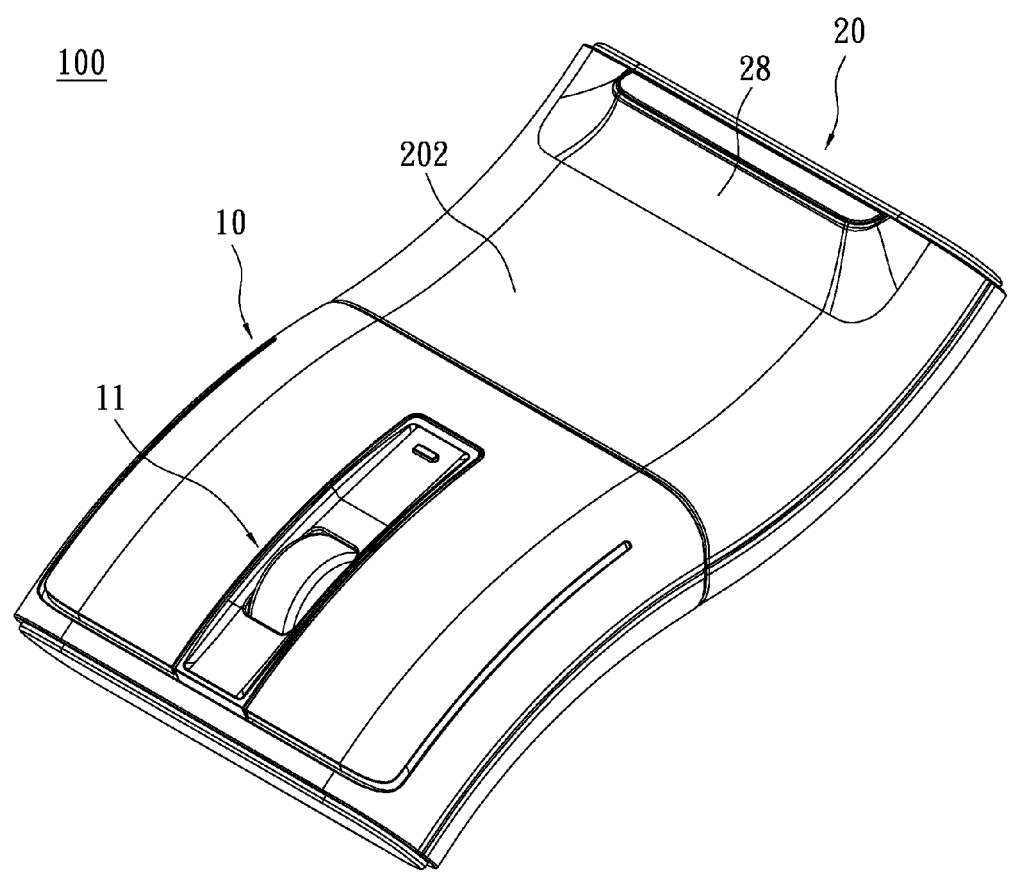
FIG. 4 is a perspective assembled view of the transformable cursor controlling apparatus of second configuration according to the present disclosure.

Please refer to FIG. 3 and FIG. 4 which related to another transformed posture of this embodiment. The second housing 20 is rotated 180 degrees along an axial of the first joint surface 12 of the first housing 10. In other words, the upper surface 201 and the lower surface 202 of the second housing 20 are turned upside down. In the meantime, the electrical connector 24 can be plugged into the other socket 14b. The first housing 10 and the second housing 20 are connected into a wave posture as shown in FIG. 4, which corresponded to an idle condition of the computer mouse. Otherwise, the present disclosure can assign the other sockets 14b as another function module, for example, a wireless presenter or remote controller . . . etc. The power electricity can be transmitted through the electrical connector 24 to activate another function module.

The transformable cursor controlling apparatus 100 of the present disclosure further includes an auxiliary positioned structure, which is disposed on the first joint surface 12 of the first housing 10 and the second joint surface 22 of the second housing 20. Refer to FIG. 3, the auxiliary positioned structure of this embodiment includes three positioned posts 26 which are disposed on the second joint surface 22 of the second housing 20, and three positioned holes 16 which are formed on the first joint surface 12 of the first housing 10. The intermediate positioned post 26 is disposed at a central position of the second joint surface 22 of the second housing 20. The other two positioned posts 26 are disposed at two sides of the second joint surface 22 of the second housing 20. Each of the outermost positioned posts 26 has the same distance apart from the intermediate positioned post 26. The positioned holes 16 on the first joint surface 12 of the first housing 10 are arranged alike the positioned posts 26. Therefore, after the second housing 20 is rotated 180 degrees, the two outmost positioned posts 26 can interchangeably plug in the two outmost positioned holes 16 respectively.

However the present disclosure is not limited to the above embodiment. The auxiliary positioned structure can include at least one of the positioned post 26 protruded from the second joint surface 22 of the second housing 20, and at least one positioned hole 16 formed on the first joint surface 12 of the first housing 10. The at least one positioned post 26 can be disposed at where apart from the electrical connector 24 for providing the other side a fixing force. One side of the first housing 10 is connected to the second housing 20 through the electrical connector 24, and the other side is connected through the positioned post 26 plugging in the positioned hole 16. Therefore, the connecting strength between the first housing 10 and the second housing 20 also can be enhanced.

Please refer to FIG. 3, a bottom surface of the second housing 20 further includes a protruded base 28 far away the second joint surface 22. The protruded base 28 can include a smooth pad, so that the present disclosure arranged as a computer mouse in FIG. 2 can smoothly contact a desk-top.

Figure 5:
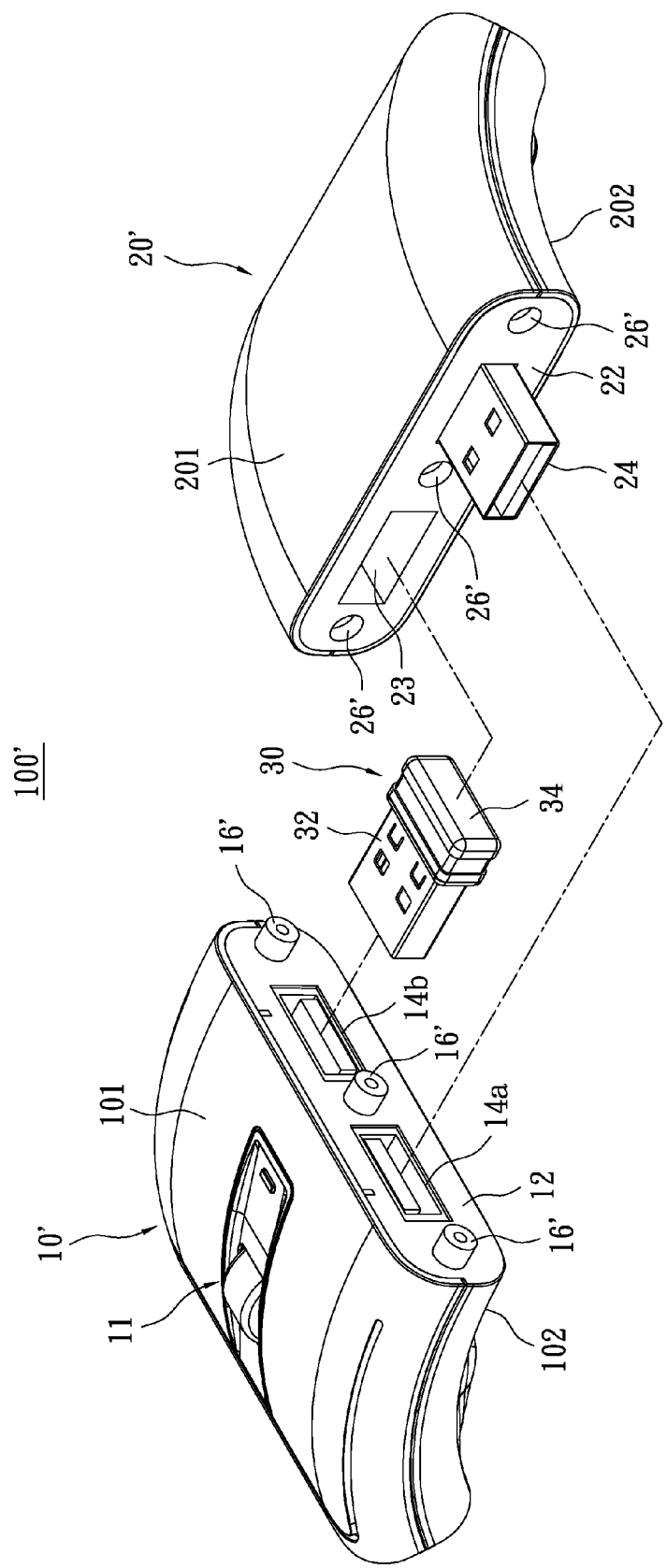
FIG. 5 is a perspective exploded view of the transformable cursor controlling apparatus of second embodiment according to the present disclosure.

Please refer to FIG. 5, which is an exploded perspective view of the present disclosure of second embodiment. In this embodiment, three positioned posts 16' are disposed on the first joint surface 12 of the first housing 10', and three positioned holes 26' are formed on the second joint surface 22 of the second housing 20'. The intermediate positioned post 16' is disposed at a central position of the first joint surface 12 of the first housing 10'. The other two positioned posts 16' are arranged at two sides of the first joint surface 12, and the distances of the two outmost positioned posts 16' apart from the intermediate positioned post 16' are the same. The three positioned holes 26' on the second joint surface 22 of the second housing 20' are arranged alike the positioned posts 16'. Therefore, when the first housing 10' is turned 180 degrees, the two outmost positioned posts 16' can interchangeably plugged in the two outer positioned holes 26'.

In this embodiment, the cursor controlling apparatus 100' of this second embodiment can accommodate a wireless receiver 30 therein. The wireless receiver 30 includes a plugging portion 32 and a wireless transceiver portion 34 connected to the plugging portion 32. The type of the plugging portion 32 is a corresponding connector matched the socket 14b of the first housing 10, such as USB connector, to plug in the socket 14b. The second joint surface 22 of the second housing 20' is formed with a concave portion 23 to receive the wireless transceiver portion 34 of the wireless receiver 30 correspondingly. When the first housing 10' and the second housing 20' are connected in an arc posture, the wireless receiver 30 can be hidden and received in the cursor controlling apparatus 100'.

Further, the wireless receiver 30 also can be hidden and received in the cursor controlling apparatus 100', when the first housing 10' and the second housing 20' of the cursor controlling apparatus 100' are connected in wave posture like the posture of FIG. 4. In other word, the first joint surface 12 of the first housing 10' is rotated 180 degrees related to the second joint surface 24 of the second housing 20'. The plugging portion 32 of the wireless receiver 30 can be plugged in another socket 14a as shown in FIG. 5, meanwhile, the electrical connector 24 is plugged in the socket 14b. Therefore, the wireless receiver 30 also can be hidden and receive in the cursor controlling apparatus 100' arranged in the wave posture.

The advantaged of the present disclosure are as followed, the transformable cursor controlling apparatus 100 can be assembled into two different postures, which corresponds to an activating condition and an idle condition. In one alternative embodiment, for the idle condition, the mouse can be transmitted into another function module to provide another operating function, such as a presenter or a remote controller.

The electrical connector 24 of the second housing 20 equipped with an USB connector can conveniently connect to the sockets 14a, 14b of the first housing 10, and also connect to an USB sockets of computer for charging electricity. Therefore, the present disclosure does not need a charger.

The present disclosure provides one simple connecting manner for the first housing 10 and the second housing 20. Besides the electrical connector 24 and the sockets 14a, 14b, one positioned post 26 and one positioned hole 16 are provided at most, so that the two housing 10 and 20 can be directly plugged oppositely to finish assembly. The electrical connector 24 can provide functions of electrical connection and mechanical connection simultaneously.

Besides, the present disclosure can hidden and receive a wireless receiver in the cursor controlling apparatus.

The description above only illustrates specific embodiments and examples of the present disclosure. The present disclosure should therefore cover various modifications and variations made to the herein-described structure and operations of the present disclosure, provided they fall within the scope of the present invention as defined in the following appended claims.

What is claimed is:

1. A transformable cursor controlling apparatus, comprising:
    a pair of housings, having a first housing and a second housing, the first housing having a first joint surface, the second housing has a second joint surface opposite to the first joint surface;
    two sockets, disposed in the first housing and explored outside the first joint surface, wherein the two sockets are arranged symmetrically along a center of the first joint surface;
    an electrical connector, disposed in the second housing and protruded outside the second joint surface, the electrical connector apart from a center of the second joint surface with a predetermined distance and selectively plugged in one of the two sockets; and
    a cursor controlling module, disposed in one of the two housings for controlling a cursor of computer;
    wherein the second joint surface of the second housing is rotated 180 degrees along a central axle related to the first joint surface of the first housing, the electrical connector is plugged in the other socket.

2. The transformable cursor controlling apparatus as claimed in claim 1, wherein two orientated directions of the two sockets are 180 degrees differential.

3. The transformable cursor controlling apparatus as claimed in claim 1, wherein the two sockets are USB socket, the electrical connector is a USB plug.

4. The transformable cursor controlling apparatus as claimed in claim 1, further comprising an auxiliary positioned structure disposed on the first joint surface of the first housing and the second joint surface of the second housing.

5. The transformable cursor controlling apparatus as claimed in claim 4, wherein the auxiliary positioned structure includes at least one positioned post protruded from the second joint surface of the second housing, and at least one positioned hole formed on the first joint surface of the first housing, wherein the at least one positioned post and the electrical connector are apart and disposed on two ends of the second joint surface.

6. The transformable cursor controlling apparatus as claimed in claim 4, wherein the auxiliary positioned structure includes at least one positioned post protruded from the first joint surface of the first housing, the at least one positioned hole is formed on the second joint surface of the second housing, wherein the at least one positioned hole and the electrical connector are apart and disposed on two ends of the first joint surface.

7. The transformable cursor controlling apparatus as claimed in claim 1, wherein the first housing and the second housing both are arc-shaped.

8. The transformable cursor controlling apparatus as claimed in claim 7, wherein the cursor controlling module is functioned in working condition, when the electrical connector is plugged in one of the two sockets on condition that the first housing and the second housing are connected into an arc posture.

9. The transformable cursor controlling apparatus as claimed in claim 7, wherein the cursor controlling module is turned to an idle condition, when the electrical connector is plugged in one of the two sockets on condition that the first housing and the second housing are connected into a wave posture.

10. The transformable cursor controlling apparatus as claimed in claim 9, further comprising another function module, the function module and the cursor controlling module are arranged in the same housing, wherein the secondary functional module is activated, when the electrical connector is plugged in one of the two sockets on condition that the first housing and the second housing are connected into a wave posture.

11. The transformable cursor controlling apparatus as claimed in claim 1, wherein a bottom surface of the second housing further comprising a protruded base apart from the second joint surface.

12. The transformable cursor controlling apparatus as claimed in claim 1, further comprising a wireless receiver, the wireless receiver having a plugging portion and a wireless transceiver portion connected to the plugging portion, the plugging portion is inserted into one of the two sockets, wherein the second housing is formed with a concave portion on the second joint surface beside the electrical connector, the wireless transceiver portion of the wireless receiver is received in the concave portion.

* * * * *